United States Patent

[11] 3,561,727

| [72] | Inventor | Domer Scaramucci<br>3245 S. Hattie, Oklahoma City, Okla. 73129 |
|---|---|---|
| [21] | Appl. No. | 703,845 |
| [22] | Filed | Jan. 25, 1968 |
| [45] | Patented | Feb. 9, 1971<br>Continuation-in-part of application Ser. No. 435,797, Mar. 1, 1965, abandoned, which is a continuation-in-part of application Ser. No. 641,415, May 8, 1967, abandoned, which is a continuation-in-part of application Ser. No. 435,975, Mar. 1, 1965, abandoned. |

[54] HIGH STRESS VALVE SEAL AND VALVES
31 Claims, 23 Drawing Figs.

[52] U.S. Cl. ............................................. 251/172, 251/315, 251/328
[51] Int. Cl. ............................................. F16k 3/02, F16k 5/06
[50] Field of Search ........................................ 251/315, 317, 172, 192, 175, 328, 327

[56] References Cited
UNITED STATES PATENTS

| 2,462,493 | 2/1949 | Hamer | 251/175X |
| 2,653,004 | 9/1953 | Schnyder | 251/172 |
| 2,857,129 | 10/1958 | Overholser et al. | 251/172 |
| 2,985,421 | 5/1961 | Anderson et al. | 251/172 |
| 3,047,265 | 7/1962 | Kaiser | 251/172 |
| 3,068,887 | 12/1962 | Grove | 251/315X |
| 3,076,631 | 2/1963 | Grove | 251/173 |
| 3,107,685 | 10/1963 | Scaramucci | 251/315X |
| 3,108,779 | 10/1963 | Anderson et al. | 251/309 |
| 3,236,495 | 2/1966 | Buchholz | 251/315X |
| 3,269,695 | 8/1966 | Grove | 251/327X |
| 3,401,915 | 9/1968 | Kim | 251/328X |

FOREIGN PATENTS

| 731,479 | 4/1966 | Canada | 251/175 |
| 907,621 | 10/1962 | Great Britain | 251/172 |
| 498,975 | 3/1953 | Italy | 251/315 |

*Primary Examiner*—M. Cary Nelson
*Assistant Examiner*—Michael O. Sturm
*Attorney*—Dunlap, Laney, Hessin & Dougherty ABSTRACT: A valve seat assembly including a rigid material seating ring having a seating surface shaped to engage a movable valve member when the valve member is in a closed position, and including a thin, elastic material annular seal bonded to the seating ring adjacent the seating surface. The seal protrudes beyond the seating surface to be engaged by the valve member and has a length substantially greater than the thickness thereof to be placed in a high state of stress when distorted by the valve member. The seat is particularly suited as an upstream seat, and the seal is preferably positioned adjacent the inner periphery of the seat to minimize abrasive wear and throttling when the valve approaches full closure.

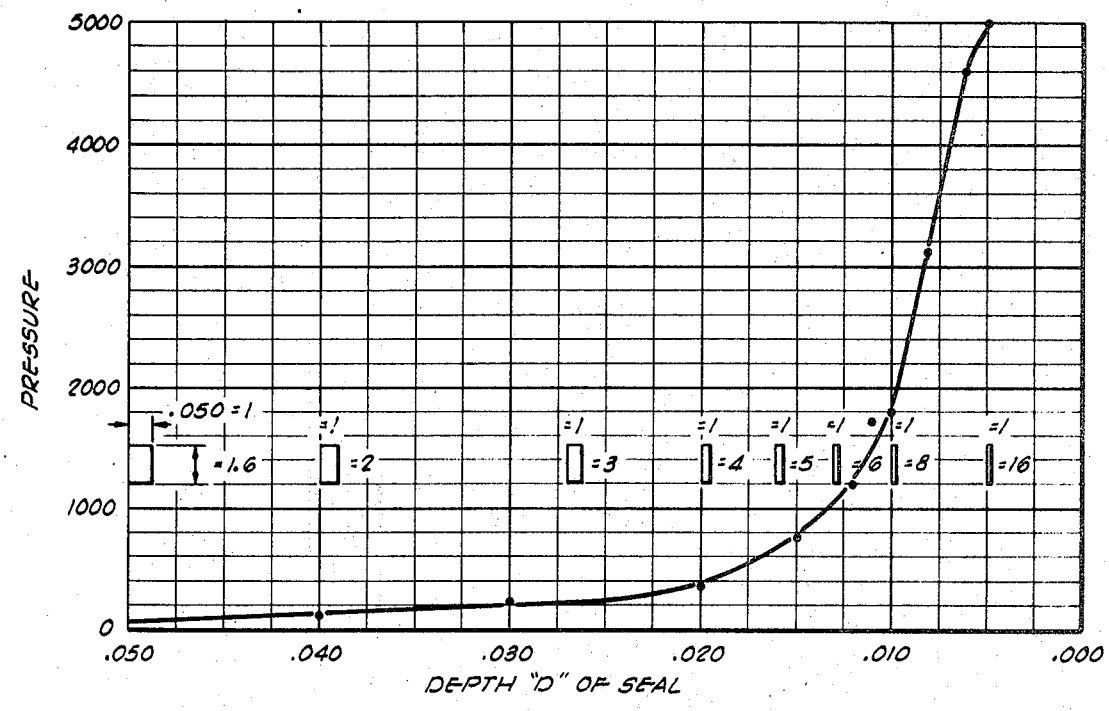
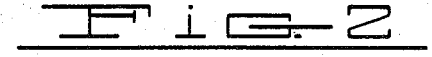
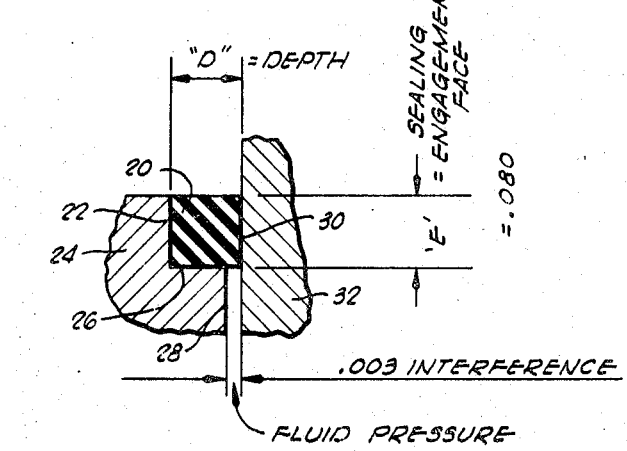

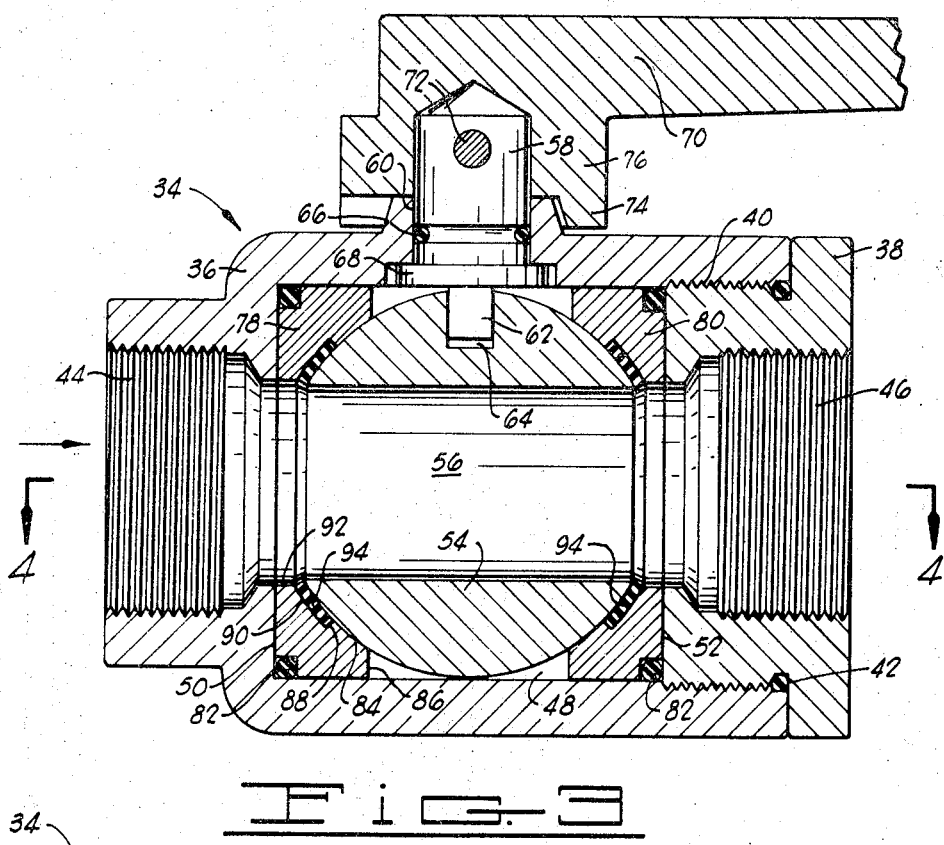
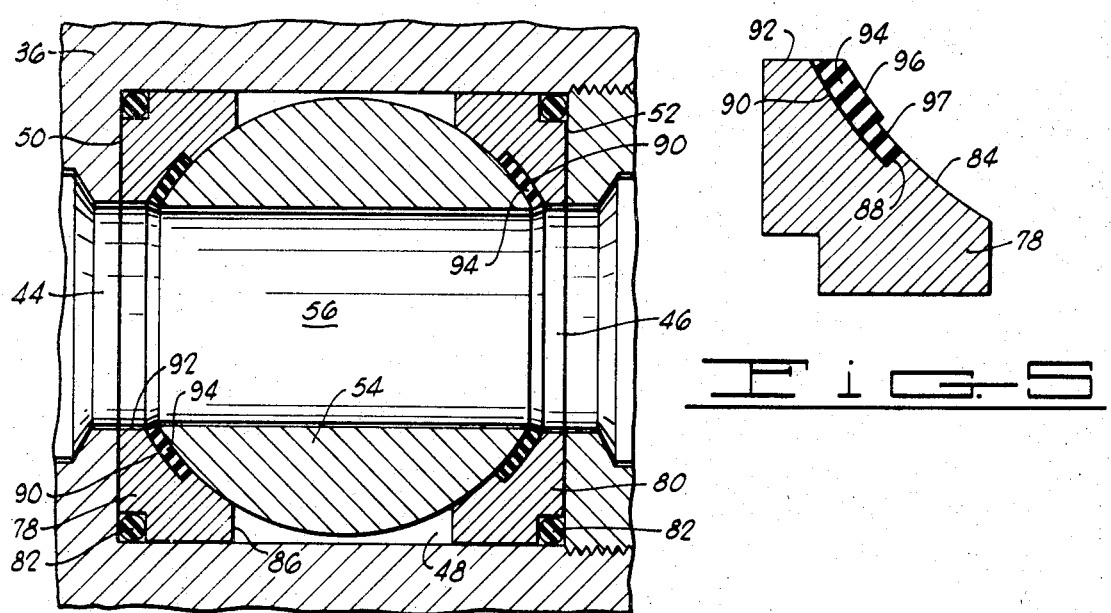

INVENTOR.
DOMER SCARAMUCCI
BY
Dunlap and Laney
ATTORNEYS

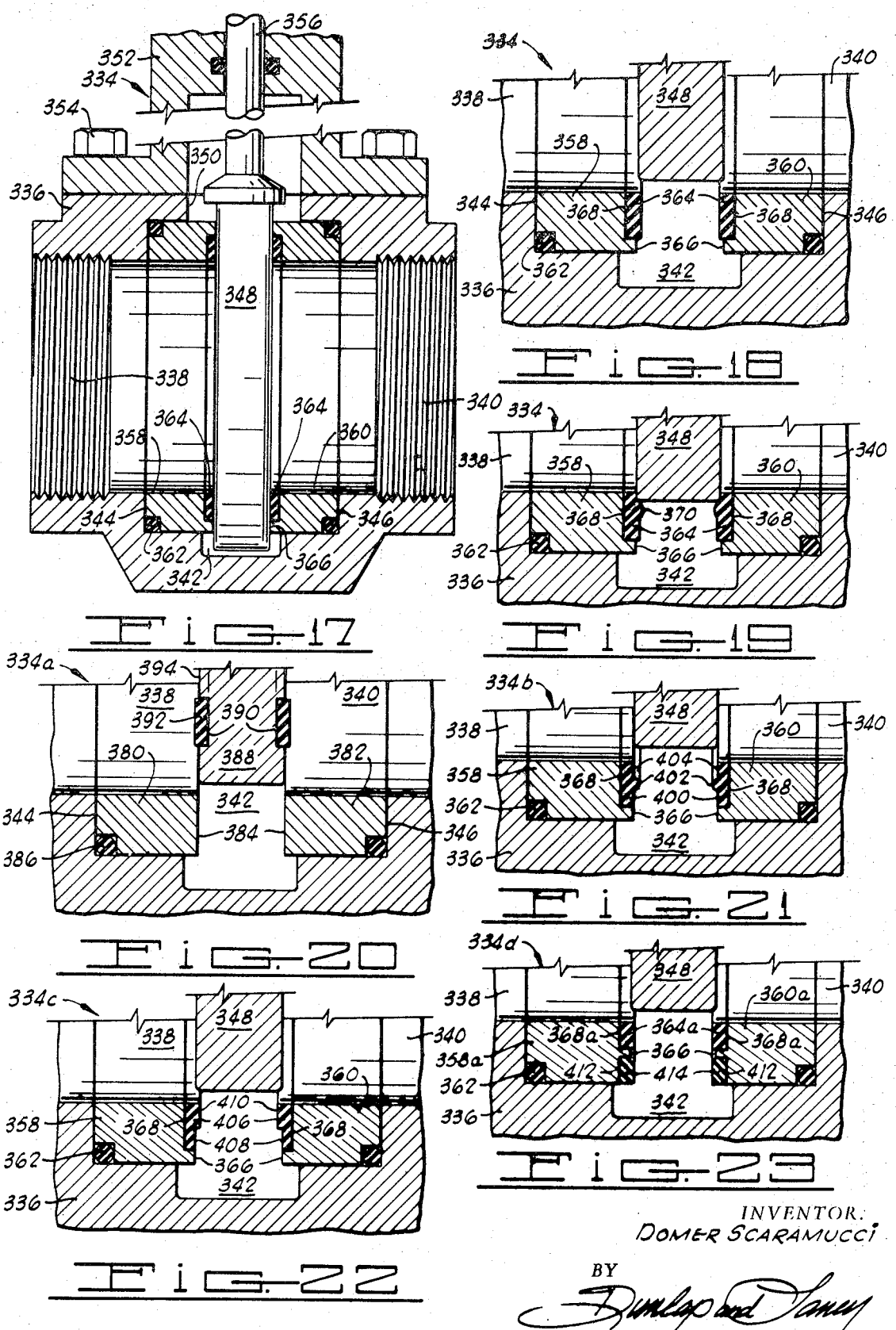

HIGH STRESS VALVE SEAL AND VALVES

CROSS-REFERENCES TO RELATED APPLICATIONS

This is a continuation-in-part of applicant's copending application Ser. No. 435,797 entitled "Gate Valve Using High Stress Seals" filed Mar. 1, 1965, now abandoned, and of applicant's copending application Ser. No. 641,415 entitled "High Stress Valve Seal and Rotary Valve" filed May 8, 1967, now abandoned, which application is, in turn, a continuation-in-part of application Ser. No. 435,975 entitled "High Stress Valve Seal and Rotary Valve" filed Mar. 1, 1965 and now abandoned.

BACKGROUND OF THE INVENTION

1. Field of the Invention

This invention relates generally to an improved valve seal designed to operate under high stress conditions, and more particularly, but not by way of limitation, to valves utilizing a seal operating under high stress conditions.

2. Description of the Prior Art

As it is well known in the art, metal-to-metal seals have not generally proven satisfactory for valve constructions. It is extremely difficult and expensive to manufacture a valve wherein the clearance between the moving valve member and a cooperating seat structure is small enough to seal off most liquids, and it is virtually impossible to obtain a sufficiently small clearance to seal off gases. Even highly polished metal surfaces have variations therein, such that two highly polished metal surfaces in contacting relation will frequently not effectively seal against the leakage of gas therebetween. As a result, elastic material seals are almost universally used between the movable members and seats of valves.

Heretofore, one of the primary problems in valve design has been the placement or location of the seals in order to prevent damage to the seals during the opening and closing movements of the valve. This has been particularly true when softer seal materials have been used, that is, seals having a durometer of from about 60 to 70. Such prior valve seals have relied upon a relatively large mass of material positioned either to be compressed between a valve member and seat, or positioned to be pressed into sealing relation against the valve member and valve seat by fluid under pressure. However, except for low pressure service conditions, it has heretofore been impractical to mount the valve seal in a position to perform its sealing function primarily by being compressed between the valve member and the valve seat. For example, in a ball valve, it has been impractical to position prior valve seals in the upstream valve seat immediately around the inlet to the valve, as contrasted with being positioned in the valve chamber remote from the valve inlet. When a relatively soft seal of the type used in the past is placed around the inlet of a ball valve, the incoming pressure distorts the seal into the path of movement of the ball member, whereby the ball member shears off an appreciable portion of the seal during the closing movement of the valve. As a result, the relatively soft seals have been positioned in the valve chamber remote from the valve inlet in a position to seal against the valve member on the downstream side of the valve in response to the pressure applied by the fluid entering the valve chamber, particularly in higher pressure valves. With the seal positioned in the valve chamber, any abrasive material carried by the fluid being controlled has access to the metal seating surface of the upstream seat to cause appreciable damage both to the seat and to the valve member.

It is recognized that relatively hard valve seals, such as valve seals made of plastics or rubber in a durometer range of from 80 to 90, have been used around the inlets of valves for high pressure service. However, such seals do not conform to the surface of the valve member as well as the softer seals and are therefore more inclined to leak, particularly when the fluid being handled includes some gas. Also, such harder seals are more subject to the abrasive action of abrasive fluids being handled by the valve and have frequently been found to have a relatively short service life.

SUMMARY OF THE INVENTION

The present valve seal relies upon shape or configuration, rather than placement, to form its sealing function and thus allows the seal to be designed around the valve, rather than having the valve designed to fit the seal, as has been the practice in the past. The present seal preferably utilizes a relatively soft material, such as natural or synthetic rubber in the durometer range of 60 to 70, to obtain the maximum sealing and abrasive resistance characteristics. The seal may be mounted either in a valve seat or in a valve member and broadly comprises a body of elastic material having a length substantially greater than its thickness and being mounted and bonded in a mating groove adjacent a rigid load bearing or seating surface. The body protrudes beyond the load bearing surface only a sufficient distance to be placed under compression when mated with the cooperating valve member or seat. The interference provided by the protrusion of the elastic material beyond the load bearing surface, although small, is sufficient to effectively seal against the mating member or seat and to place the elastic material in a high state of stress when the mating valve member or seat is in engagement with the load bearing surface, whereby the elastic material has the maximum resistance to further deformation in response to the action of fluid under pressure attempting to escape between the elastic material and the mating valve member or seat. The body is also provided with a relieved portion adjacent the load bearing surface to minimize the possibility of a portion of the body being pinched off between the load bearing surface and the cooperating member or seat.

An object of this invention is to provide a valve seal which may be utilized to seal against the flow of any type of fluid.

Another object of this invention is to provide a valve seal constructed to operate in the most efficient stress range of the material comprising the seal.

A further object of this invention is to provide a valve seal which may be economically manufactured and which will have a long service life.

Another object of this invention is to provide a valve seal which will be subjected to the minimum damage, even when placed in a position heretofore impractical with valve seals.

Another object of this invention is to provide a valve seal utilizing an elastic material having the optimum sealing and abrasion resistant characteristics and yet which may be utilized in high pressure service.

A still further object of this invention is to provide a rotary type valve capable of high pressure service wherein the seats of the valve will be subjected to a minimum of abrasive action.

Another object of this invention is to provide a rotary type valve wherein flow through the valve will be immediately stopped when the trailing edge of the port through the rotary member of the valve reaches the upstream seat during the closing movement of the rotary member.

A further object of this invention is to provide a rotary type valve which will not produce a throttling action during the closing movements of the valve.

Another object of this invention is to provide a rotary type valve having both upstream and downstream seals.

A further object of this invention is to provide a rotary type valve which may be economically manufactured and which will have a long service life.

Another object of this invention is to provide a gate valve construction wherein the seating surface of both the upstream and downstream seats will be subjected to a minimum of abrasion and erosion.

A further object of this invention is to provide a gate valve seat assembly utilizing a seal having the maximum wear and abrasive resistance characteristics.

A still further object of this invention is to provide a gate valve seat assembly which will be subject to a minimum of erosion in its seating surface when in service in a gate valve.

Other objects and advantages of the invention will be evident from the following detailed description when read in conjunction with the accompanying drawings which illustrate the invention.

BRIEF DESCRIPTION OF THE DRAWING

FIG. 1 is an enlarged partial cross-sectional view of a seal and a portion of a test apparatus to illustrate the principles of construction and operation of the seal.

FIG. 2 is a graph showing the variations in the sealing ability of a seal upon variation of the ration ratio between the thickness or depth of the seal and the length of the seal.

FIG. 3 is a vertical cross-sectional view through a ball type valve illustrating the use of the present novel seals therein, but showing the seals enlarged for clarity of illustration.

FIG. 4 is a partial cross-sectional view of the valve of FIG. 3 taken along the lines 4—4 of FIG. 3.

FIG. 5 is an enlarged cross-sectional view through a valve seat of the type shown in FIGS. 3 and 4 showing the configuration of the seal in its relaxed state, with the seal being shown exaggerated in size for clarity of illustration.

FIG. 17 is a vertical sectional view through a gate valve constructed in accordance with this invention, but showing the valve seals enlarged for clarity of illustration.

FIG. 18 is an enlarged partial sectional view through the lower portion of the gate valve of FIG. 17 illustrating more clearly the details of construction of the preferred seal, but again showing the seals enlarged.

FIG. 19 is a view similar to FIG. 18 showing a further step in the operation of the valve.

FIG. 20 is a partial vertical sectional view through a gate valve showing the use of a modified seals, with the seals being shown enlarged for illustration purposes.

FIG. 21 is a view similar to FIG. 18 illustrating the construction of another modification of the seals.

FIG. 22 is a view similar to FIG. 22 showing another modification of the seals.

FIG. 23 is another view similar to FIG. 22 showing still another modification of the seals.

DESCRIPTION OF THE PREFERRED EMBODIMENTS

General

Figure 8:
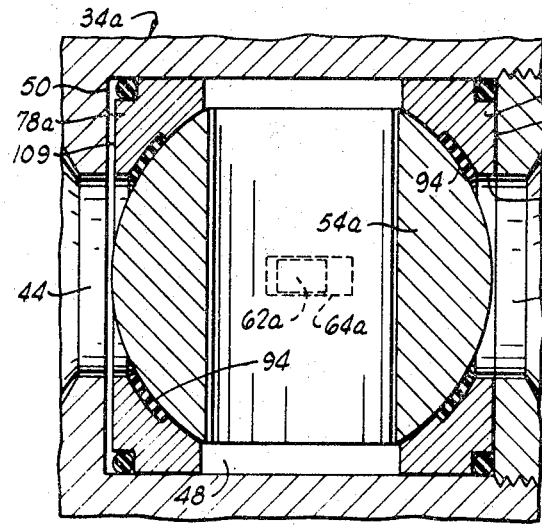
FIG. 8 is a view similar to FIG. 4, except it is a sectional view looking upwardly instead of downwardly through a valve to illustrate the use of the present valve seal in a valve wherein the ball member is "floating" rather than being journaled on a fixed vertical axis.

Referring to the drawings in detail, and particularly FIG. 1, reference character 20 designates an annular valve seal, only a cross section of which is shown for the purpose of illustrating a test arrangement utilized in testing the sealing ability of the seal under varying conditions. The seal 20 was mounted and bonded in a groove 22 in one member 24 which may be considered the seat member. One end of the groove 22 was open to allow distortion of the seal 20, and the opposite end 26 was closed, terminating in a face 28 representing a load bearing seating surface. The exposed load bearing face 30 of the seal 20 protruded beyond the seating surface 28 a distance of .003 inches in a series of tests from which the data of FIG. 2 were obtained, as will be described.

The face 30 of the seal 20 was engaged by another member 32 which may be considered a valve member. In each of the tests, the valve member 32 was forced toward the seat member 24 until the valve member contacted the seating surface 28 to place the seal 20 under a state of compression; whereupon, water under pressure was directed to the interface between the valve member 32 and seating surface 28, as indicated by the arrow designated "fluid pressure," until the water leaked past the seal 20.

In production of the data giving rise to the curve of FIG. 2, the length of the sealing engagement load bearing face 30 (E in FIG. 1) and the amount of seal material protruding beyond the seating surface 28 were maintained constant while the depth or thickness (D in FIG. 1) was varied. In each instance, the seal 20 was formed of a synthetic rubber having a durometer between 60 and 70 and was bonded in the groove 22. Since rubber is relatively uncompressible, the seal 20 protruded from the open end of the groove 22 when the valve member 32 was brought into contact with the seating surface 28. As noted above, the fluid under pressure was applied to the seal until the fluid leaked between the sealing engagement face 30 of the seal and the mating face of the valve member 32, and the corresponding pressure readings were plotted against the thickness of seal used to produce the curve in FIG. 2.

In FIG. 2, the rectangles arranged transversely across the graph represent the cross-sectional variations in the seal 20 at the corresponding depth FIGS. along the bottom of the graph to more clearly illustrate the effect of varying the ratio of the depth to the sealing engagement face or length of a seal. The data obtained in the test show a marked increase in sealing ability when this ratio approaches 1:4. Prior to a ratio of about 1:4, the increase in pressure holding ability of the seals increased only gradually at a linear rate. But at ratios from about 1:4 to about 1:8, the seals showed a marked increase in sealing ability, with the rate of increase being nonlinear. Between the ratios of about 1:8 to about 1:16, the rate of increase in pressure holding or sealing ability was again substantially linear, but was at a much faster rate than between the ratios of about 1:1.6 to 1:4. The test was terminated when the seal configuration reached a depth to sealing engagement load bearing face ratio of about 1:16 since the pump being used to supply pressure to the seals had a maximum pressure of about 5,000 psi.

It should be noted again that in all of the tests giving rise to the date in FIG. 2, the protrusion of the seal material beyond the load bearing surface 28 was maintained constant to provide uniform distortion of the various seals used in the test. It will also be noted that the protrusion was .003 inches and the amount of clearance normally provided in a manufacturing operation between the mating surfaces of a valve member and a seat member vary from .002 to .005. It should further be noted that the thickness of the material of the seal protruded beyond the seating surface 28 was about one-seventh the total thickness of the seal when the ratio of thickness-to-length was 1:4.

The reason for the unexpected sealing ability of the seals when the depth-to-length ratio approached 1:4 is not understood. However, it is known that since the various depths of seals were distorted the same amount, the thinner seals were distorted more per unit of volume and therefore higher stresses were induced in the rubber material as the relaxed thickness of the material decreased. It is also known that the force required to distort rubber increases at a linear rate until shortly before the rubber ruptures. The distortion of rubber shortly prior to rupture requires a greatly increased force, that is, rubber under high stress conditions requires greatly increased applications of force thereto in order to obtain further distortion. It is therefore believed that the remarkable increase in sealing ability with the thinner seals, as shown in FIG. 2, was obtained when the seal material was in what may be considered its high stress range.

Embodiment of FIGS. 3—8

An application of the seal of this invention is illustrated in a rotary type valve shown in FIG. 3 and generally designated by reference character 34. The body of the valve 34 is formed in two sections, 36 and 38, connected by threads 40 and having a sealing ring 42, such as an O-ring, positioned therebetween. An inlet 44 is provided in the body section 36 and an outlet 46 is provided in the body section 38 in alignment with the inlet 44. The inlet 44 and the outlet 46 are threaded or otherwise suitably adapted for connection with adjacent sections of a flow line (not shown). An enlarged valve chamber 48 is provided in the central portion of the valve intersecting the inlet 44 and outlet 46. The valve chamber 48 forms a shoulder 50 extending concentrically around the inlet 44 and a shoulder 52 extending concentrically around the outlet 46.

A ball member 54 is positioned in the valve chamber 48 and is provided with a flow passage or port 56 therethrough conforming in diameter to the inner ends of the inlet 44 and outlet 46 to control the flow of fluid through the valve in the usual manner. A valve stem 58 extends transversely through the mating aperture 60 in the wall of the body section 36 into engagement with the ball member 54. The inner end 62 of the valve stem is suitably shaped, such as being square in cross section, and fits in a mating bore 64 in the ball member 54 for turning the ball member upon turning of the stem. It may also be noted that the stem 58 is sealed in the aperture 60 by a suitable O-ring 66 or the like and is prevented from being removed from the valve body by a flange 68 contacting the inner wall of the body section 36 around the aperture 60. A suitable handle 70 is secured to the outer end of the stem 58, such as by a pin 72, for manually turning the ball member 54. One or more lugs 74 are positioned on the hub 76 of the handle 70 and are arranged to mate with projections (not shown) on the valve body to limit the turning movement of the handle 70 to approximately 90° for opening and closing the valve.

An upstream valve seat 78 of high strength material, such as metal, is positioned in the valve chamber 48 against the shoulder 50, and a similar downstream valve seat 80 is positioned in the valve chamber in contact with the shoulder 52. Each of the valve seats 78 and 80 is provided with a suitable sealing ring 82, such as an O-ring, in the outer periphery thereof to sealingly engage the outer periphery of the valve chamber 48 and prevent the leakage of fluid around the outer sides of the valve seats. The inner or front face 84 of each of the valve seats is curved on the arc of a circle conforming to the curvature of the outer surface of the ball member 54 from the inner edge 86 of the respective seat to approximately the center 88 of the respective seat to provide what is called herein a rigid load bearing or seating surface. It may also be noted here that the valve seats 78 and 80 are so sized with respect to the chamber 48 and ball member 54 that the ball member 54 can not move laterally in the valve from the inlet 44 toward the outlet 46, or vice versa, except for a distance conforming to the manufacturing tolerance between the outer surface of the ball member 54 and the load bearing surfaces 84. As previously indicated, such clearance is normally only between .002 and .005 inches. It may therefore be considered that the ball member 54 is journaled on a fixed vertical axis.

The front face of each of the valve seats 78 and 80 is also provided with a groove 90 facing the ball member 54 and extending from the center portion 88 of the front face to the inner periphery 92 of the respective seat to receive the novel valve seal 94 of this invention. It may also be noted here that the diameter of the inner periphery 92 of each of the valve seats conforms to the diameter of the inner end portion of the respective inlet 44 or outlet 46 to provide a continuation of the inlet 44 or outlet 46. It will thus be seen that the valve seal 94 on the valve seat 78 immediately surrounds the inlet 44 and thus the flow passage through the valve, as contrasted with being exposed to the valve chamber 48. Stated differently, the groove 90 has an open side facing the flow passageway through the seat, and the seal 94 is exposed at this location. The seal 94 on the seat 80 is similarly situated with respect to the outlet 46.

As shown most clearly in FIG. 5, the seal 94 has a sealing engagement load bearing face 96 extending over the major portion of the length of the seal curved to substantially conform to the curvature of the seating surface 84 and, thus, the outer surface of a cooperating ball member, but protrudes beyond the seating surface 84 a short distance to provide a slight interference with the movement of the ball member 54 over the seal. The seal 94 also has a groove 97 in the outer peripheral portion thereof between the sealing engagement face 96 and the seating surface 84 to provide the seal with a relieved portion, as will be described below.

Figure 6:
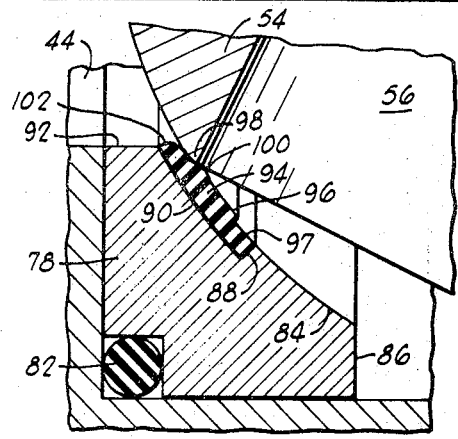
FIG. 6 is an enlarged detailed cross-sectional view of a portion of a valve seat and valve ball illustrating the operation of the valve seal shown in FIG. 5 and in the valve of FIGS. 3 and 4 at what is normally considered the throttling position of the valve, with the seal being shown exaggerated for illustration purposes.

The extent of interference provided by the seal 94, that is, the distance of protrusion of the sealing engagement face 96 beyond the seating surface 84 is only sufficient to assure engagement of the seal by the ball member 54. For example, the sealing engagement face 96 may protrude beyond the seating surface 84 a distance of .002 to .005 inches. Thus, when the trailing edge 98 of the valve port 56 reaches the seal 94 during the closing movement of the valve, as shown in FIG. 6, the sealing engagement face 96 of the seal will be only slightly distorted as illustrated by the small bulge 100 in FIG. 6. It may also be noted that simultaneously with formation with the slight bulge 100, the open end 102 of the seal 94 may also bulge outward to accommodate the volume of the seal displaced by the trailing edge 98 of the valve port 56. It may further be noted here that the port 56 through the ball member 54 will be effectively closed as soon as the trailing edge 98 of the port engages the upstream seal 94 to effectively prevent a throttling action, that is, prevent the leakage of fluid between the outer surface of the ball 54 and the upstream valve seat 78 which would cause erosion of the outer surface of the ball member, particularly when abrasive laden fluids are being handled. It will be understood that the downstream seal 94 will be effectively engaged by the trailing edge of the ball port 56 at the opposite end of the port simultaneously with engagement of the trailing edge 98 with the upstream seal 94 to further assure that the flow of fluids through the valve will be stopped as soon as the edge 98 of the port engages the upstream seal 94.

Each of the seals 94 has a load bearing sealing engagement face which has a length substantially greater than the total thickness of the seal in the relaxed condition of the seal. For example, each seal 94 may have load bearing sealing engagement face which has a length of .080 inches, and may have a total thickness, in its relaxed state, of .015 inches. A seal having a sealing engagement face length of four times greater than the total thickness of the seal provides highly beneficial sealing characteristics as noted above in connection with the discussion of FIGS. 1 and 2. However, I prefer to use a seal 94 having a sealing engagement face length approximately eight times the overall thickness of the seal. With this ratio, the elastic material comprising the seal 94 is placed in a highly stressed condition when contacted by the ball member 54. Also, and as previously indicated, each seal 94 is preferably formed of an elastic material such as natural or synthetic rubber having a durometer between about 60 and about 70. Such a material readily conforms to the small inherent variations in the outer surface of the ball member 54 to effectively seal against gases as well as liquids and provides the optimum wear and abrasion resistance characteristics.

Figure 7:
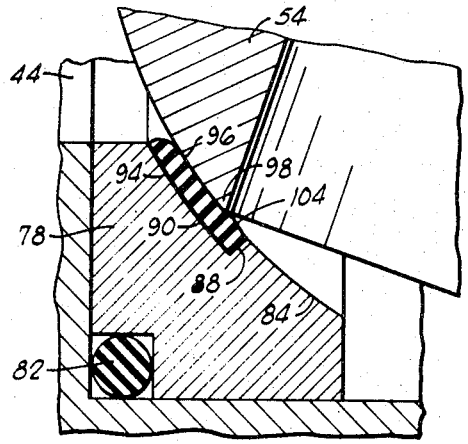
FIG. 7 is a view similar to FIG. 6 showing the action of the seal when the valve is approximately halfway closed.

FIG. 7 illustrates the valve member 54 when it is approximately half way closed, with the trailing edge 98 of the ball member port 56 still in engagement with the upstream seal 94. As shown exaggerated in this FIG., the material of the upstream seal 94 will be slightly bulged or distorted at 104 immediately preceding the port edge 98 until the edge 98 reaches the closed end 88 of the groove 90. The relief groove 97 in the seal 94 adjacent the end 88 of the groove 90 minimizes the possibility of a portion of the seat material from being pinched off between the trailing edge 98 of the ball member port and the corner formed between the groove end 88 and the seating surface 84. When the bottom of the groove 97 is substantially flushed with the seating surface 84, destructive pinchoff has not been encountered.

When the valve ball 54 is in a closed or substantially closed position, the upstream seal 94 will be effectively trapped between the walls and end 88 of the groove 90 and the surface of the ball 54 to prevent even extremely high pressure fluid present at the inlet of the valve from passing between the seal 94 and the ball 54. In order for such high pressure fluid to leak between the upstream seal 94 and the ball 54, the seal 94 would have to be distorted away from the ball 54 back toward the inlet of the valve. At the downstream side of the valve, the downstream seal 94 will not be trapped by the respective walls of the respective groove 90 and the ball 54. However, since the downstream seal 94 will be in a highly stressed condition, the pressure which may exist in the valve chamber 48 will need to be excessive before it will leak past the downstream seal. In this o connection it may be noted that the seal discussed in connection with FIGS. 1 and 2 was positioned similarly to the downstream seal 94 of the valve 34 and the data illustrated in FIG. 2 clearly shows an effective seal. Thus, the seals 94 in the valve 34 form both upstream and downstream seals capable of withstanding high pressures, even though the seal materials are in the softer material range.

As previously indicated, the ball member 54 in the valve 34 is so mounted that it will not move toward the outlet 46 when in a closed position, and the upstream and downstream seals 94 are always positioned to sealingly engage the ball 54, such that any fluid which may become trapped under pressure inside the valve body could not escape. When it is desired to provide for an escape of such trapped fluid, the valve 34 may be modified as illustrated in FIG. 8.

The modified valve 34a is provided with the valve chamber 48 intersecting the inlet 44 and outlet 46 as in the previous embodiment. In this modified valve, however, the slot 64a in the top of the ball 54a is elongated with respect to the shaped end 62a of the valve stem, such that the ball 54a is free to slide toward the outlet 46 or the inlet 44 when the valve is in a closed position. Also, the modified seating rings 78a and 80a are sized to provide a small clearance between the rings and the respective chamber shoulders 50 and 52 when the valve ball 54a is in the center of the valve chamber. Otherwise, the modified seating rings 78a and 80a are constructed in the same manner as the seating rings 78 and 80 previously described.

When the modified valve 34a is closed as shown in FIG. 8, the valve ball 54a will be moved by the pressurized fluid at the inlet 44 toward the outlet 46. The outer face 108 of the downstream seating ring 80a will thus be brought into contact with the chamber shoulder 52, but the outer face 109 of the upstream seating ring 78a will be displaced from the adjacent chamber shoulder 50 by virtue of the upstream fluid acting on the outer face 109 of the upstream seating ring. The upstream seal 94 in the modified valve 34a will thus still be effective to prevent the entrance of fluid into the valve chamber 48. However, should the pressure in the chamber 48 build up in excess of the upstream pressure, such chamber pressure will react on the upstream seating ring 78a and force the upstream seating ring back toward the chamber shoulder 50 and allow the pressure in the chamber to bleed upstream into the inlet 44 between the upstream seal 94 and the adjacent surface of the ball 54a.

Figure 9:
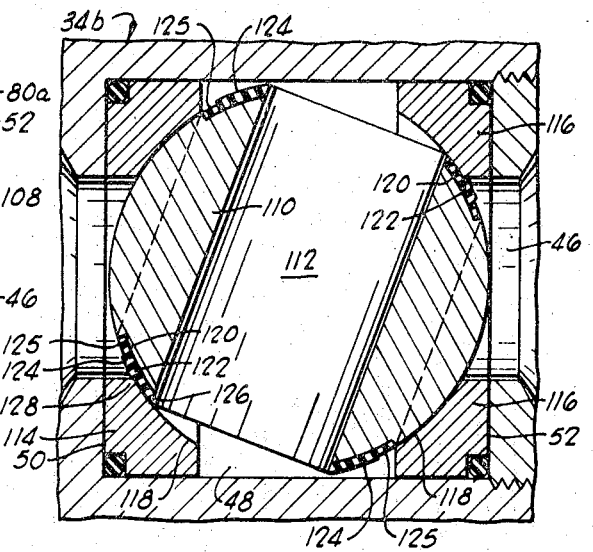
FIG. 9 is another illustration similar to FIG. 4 showing the positioning of the valve seal on the valve ball, rather than the seat, and illustrating the position of the ball member at the normal throttling position of the valve.
Figure 10:
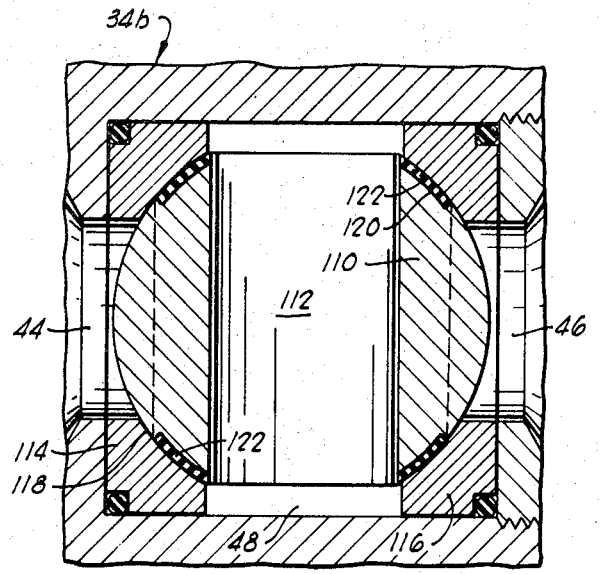
FIG. 10 is a view similar to FIG. 9 showing the closed position of the valve.

Embodiment of FIGS. 9 and 10

A modified valve 34b is illustrated in FIGS. 9 and 10 to show the application of the alternate valve seal construction. The valve 34b includes the valve chamber 48 and the valve chamber shoulders 50 and 52 adjacent the inlet 44 and outlet 46 respectively. A valve ball 110 is mounted for rotation in the valve chamber 48 and is provided with the usual port or flow passageway 112 therethrough. An upstream seating ring 114 is provided in the valve chamber 48 in contact with the shoulder 50, and a downstream seating ring 116 is positioned in the valve chamber in contact with the shoulder 52. The front face 118 of each of the seating rings 114 and 116 is curved on the arc of a circle conforming to the curvature of the outer surface of the ball 110 throughout the length of the respective front face, such that each such front face 118 forms a load bearing or seating surface to support the load applied on the ball 110.

Annular grooves 120 are formed in the outer surface of the ball 110 on opposite sides of the flow passage 112 to receive sealing rings 122. Each seal 122 is shaped in the same manner as the seals 94 previously described and is bonded in the respective groove 120 to form a seal which will be placed under high stress when contacted by the respective seating ring 114 or 116. In other words, each seal ring 122 has an outer seal engaging face 124 protruding slightly beyond the outer surface of the ball 110, and a relief groove 125 between the seal engaging face 124 and the seating surface of the ball member. The length of the sealing engaging face 124 of each seal ring 122 is substantially greater than the thickness or depth thereof in the relaxed condition of the seal ring.

When the ball member 110 is moved toward a closed position as illustrated in FIG. 9, the leading edge 126 of one seal ring 122 will engage one edge 128 of the upstream seating ring 114 adjacent the inlet 44 to immediately close off the valve chamber 48 from the inlet 44 and prevent the usual throttling of fluid between the ball member and seat. The same action occurs with the other seal ring 122 at the outlet 46 to further assure that no fluid will then flow through the valve. Thus, the seating surface 118 of each of the seating rings and the outer surface of the ball 110 will be subjected to a minimum of washing or eroding action of fluids being handled by the valve.

Figure 11:
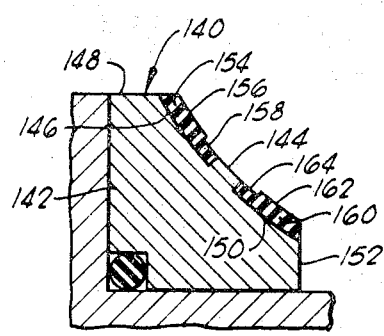
FIG. 11 is another view similar to FIG. 5 showing a modified seal construction in its relaxed state.

As the ball member 110 is moved on to a closed position as illustrated in FIG. 10, the seal rings 122 will be distorted by the seats 114 and 116 in the same manner as the seal rings 94 were distorted by the ball 54 in the valve 34 previously described. Thus, the seal rings 122 will provide both upstream and downstream seals for the valve 34b. It may be noted, however, that in the valve construction 34b, the downstream seal ring 122 will be trapped by its mating groove 120 and the downstream seating ring 116; whereas, the upstream sealing ring 122 will not be similarly trapped. However, as previously indicated, when the thin seal is placed under high stress, it will not be distorted by relatively high pressure, even though it is not trapped. Thus, the upstream sealing ring 122 will provide an upstream seal for the valve 34b unless the pressure being handled by the valve is excessive.

of FIG. 11

When both upstream and downstream seals are desired, it is preferred to utilize upstream and downstream seat assemblies as illustrated in FIG. 11 and designated generally by reference character 140. A seat assembly 140 comprises a rigid material seating ring 142 having a seating surface 144 shaped to mate with a cooperating valve ball. An annular groove 146 is formed in the seating ring 142 to extend from the inner periphery 148 of the seating ring to the inner periphery of the seating surface 144. A second annular groove 150 is formed in the seating ring 142 to extend between the inner end 152 of the seating ring, and the outer periphery of the seating surface 144.

An annular seal 154 of relatively soft elastic material is bonded in the groove 146 to extend from the inner periphery 148 of the seating ring to the seating surface 144. The seal 154 has a ball-engaging or sealing engagement surface 156 extending from the inner periphery 148 of the seating ring over the major portion of the length of the seal which is shaped on substantially the same radius as the seating surface 144 and which protrudes beyond the seating surface 144 in the same manner as the seal engagement face 96 of the seal 94 previously described. The seal 154 is also provided with a relief groove 158 between the ball engaging surface 156 and the seating surface 144 to provide a relieved portion for the seal. A second annular seal 160 of relatively soft elastic material is bonded in the groove 150. The seal 160 is shaped in the same manner as the seal 154, except being opposite hand, with a protruding ball-engaging or sealing engagement surface 162 and a relief groove 164 formed between the ball-engaging surface 162 and the seating surface 144.

Each of the seals 154 and 160 has length substantially greater than the thickness thereof, such that when the seals are engaged by a ball member, the seals will be placed under a high state of stress in the same manner as previously described. It should also be noted that with the seat assembly 140, what may be considered as double seals are provided at both the upstream and downstream sides of the ball. On the downstream side of the ball, the seal 160 will be effectively trapped between the ball and the seating surface 144 to enhance the sealing ability of the seal.

Figure 12:
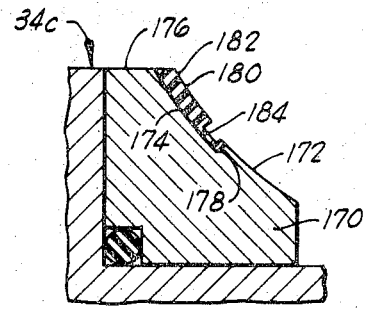
FIG. 12 is another view similar to FIG. 5 showing still another form of the seal in its relaxed state.
Figure 13:
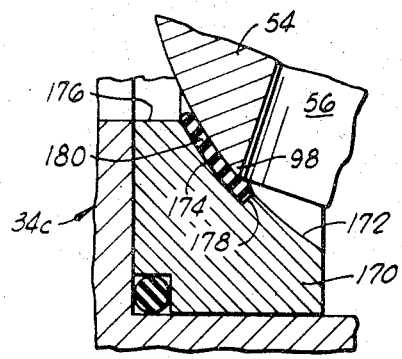
FIG. 13 is an illustration of the FIG. 12 seat assembly and a portion of a mating valve ball in near closed position.

Embodiment of FIGS. 12 and 13

A portion of a modified valve structure 34c is illustrated in FIG. 12 to show a portion of an upstream seal when in its relaxed condition. This structure includes a rigid material seating ring 170 having a seating surface 172 shaped to mate with a cooperating ball member. The seating ring 170 is also provided with an annular groove 174 extending from the inner periphery 176 of a seating ring to a shoulder 178 at the inner periphery of the seating surface 172.

An annular seal 180 of relatively soft elastic material is bonded in the groove 174 and extends from the inner periphery 176 of the seating ring to the shoulder 178. The seal 180 has a seal engagement or ball-engaging or sealing engagement surface 182 curved on substantially the same radius as the seating surface 172 but projecting beyond the seating surface 172. The sealing engagement surface 182 extends from the inner periphery of the seal to a relieving groove 184 formed in the seal adjacent the inner periphery of the seating surface 172. The bottom of the groove 184 is spaced inwardly, with respect to the seating ring 170, from the seating surface 172 to provide an additional relief for material of the seal 180 when the seal is engaged by the valve ball 54 as illustrated in FIG. 13. It may also be noted that the length of the sealing engagement surface 182 of the seal 180 is substantially greater than the thickness thereof in the same manner as the seal 94 previously described.

As will be observed, the seal 180 is constructed in substantially the same manner as the seal 94 previously described. The seal 180 will be engaged by the trailing edge 98 of the valve ball port 56 to provide a quick shutoff without appreciable throttling. As the ball 54 is moved on toward a fully closed position, a portion of the material of the seal 180 will be displaced to place the seal in a high state of stress. The relief groove 184 minimizes the tendency of the seal material to bulge ahead of the edge 98 as the edge 98 approaches the shoulder 178 to further minimize the possibility of seal material being pinched off.

Figure 14:
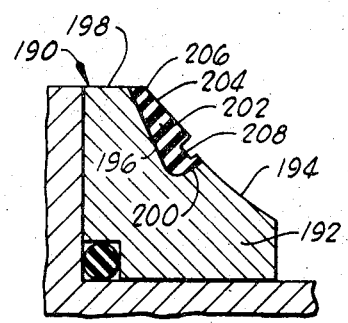
FIG. 14 is still another view similar to FIG. 5 of a modified seat assembly in its relaxed state.
Figure 15:
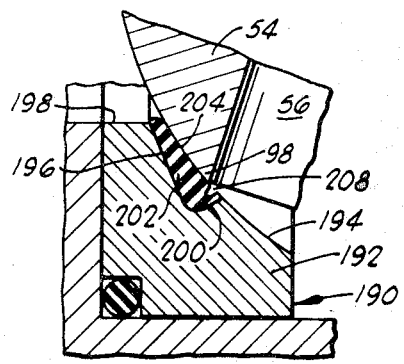
FIG. 15 is an illustration of the FIG. 14 seat assembly and a portion of a mating valve ball in near closed position.

Embodiment of FIGS. 14 and 15.

Another modified valve seat assembly 190 is partially illustrated in FIG. 14. The seat assembly 190 comprises a rigid material seating ring 192 having a seating surface 194 shaped to mate with a cooperating ball member. The seating ring 192 is also provided with an annular groove 196 extending from the inner periphery 198 of the seating ring to a shoulder 200 formed at the inner periphery of the seating surface 194. It will be observed in FIG. 14 that the depth of the groove 196 increases from the inner periphery 198 of the seating ring to the shoulder 200 for purposes to be described.

An annular seal 202 of relatively soft elastic material is bonded in the groove 196 and extends from the inner periphery 198 of the seating ring to the shoulder 30 200. A tapered sealing engagement surface 204 is provided on the seal 202 extending from the inner periphery of the seal over the major portion of the length of the seal. In a preferred construction of this embodiment, the inner edge 106 of the tapered surface 104 is positioned to lie in the periphery of a sphere will which includes the seating surface 194, such that the trailing edge 98 of a valve ball port will easily ride onto the tapered surface 204 and minimize the tendency of the inner peripheral portion of the seal to become unbonded or separated from the groove 196. The tapered surface 204 extends from the inner edge 206 thereof in a direction away from the seating ring 192 to protrude beyond the seating surface 194 in the relaxed condition of the seal. The seal 202 is also provided with a relief groove 208 between the tapered surface 204 and the shoulder 200 to minimize the possibility of the seal material being pinched off during closure of the valve ball 54.

As previously noted, the trailing edge 98 of the valve ball port 56 will easily ride over the inner edge 206 of the tapered surface 204. As the ball 54 is continued in its closing movement, the edge 98 progressively displaces material of the seal 202 to place the seal in a high state of stress when the valve ball approaches full closure. As the edge 98 approaches the shoulder 200, at least a major portion of the seal material displaced by the ball is moved into the space provided by the groove 208 to minimize the tendency of the material to be pinched off. It may also be noted that since the seal 202 becomes progressively thicker from the inner edge thereof to the groove 208, slightly more elastic material is provided in the area where the displaced seal material is accommodated. In this embodiment, the tapered surface 204 adjacent the groove 208 may extend slightly further beyond the seating surface 194 than in the previous embodiments described in view of the increased thickness of the seal to assure that the seal will be placed in a high state of stress when engaged by the ball 54. However, the maximum thickness of the seal 202 is still substantially less than the length of the sealing surface 204 thereof to assure the high stress conditions in the seal as previously described.

Figure 16:
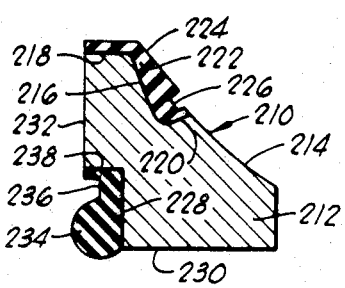
FIG. 16 is a final view similar to FIG. 5 of a modified seat assembly in its relaxed state.

Embodiment of FIG. 16

A still further modified valve seat assembly 210 is partially illustrated in FIG. 16. The seat assembly 210 comprises a rigid material seating ring 212 having a seating surface 214 shaped to mate with a cooperating ball member. The seating ring 212 is also provided with an annular groove 216 extending from the inner periphery 218 of the seating ring to a shoulder 220 at the inner periphery of the seating surface 214.

An annular seal 222 of relatively soft elastic material is bonded in the groove 216. It will also be observed that the seal 222 overlaps the inner periphery 218 of the seating ring and is bonded to the inner periphery 218 which will further minimize the possibility of the seal material becoming separated from the seating ring near the inner periphery of the ring. The seal 222 is provided with a tapered sealing engagement surface 224 and a relief groove 226 preferably sized and positioned in the same manner as the tapered surface 204 and relief groove 208 of the seal 202 previously described in connection with FIGS. 14 and 15.

The seating ring 212 is also provided with a groove 228 between the outer periphery 230 of the ring and the end 232 of the ring which normally faces a shoulder in the valve chamber. An annular seal 234 of elastic material is bonded to the walls of the groove 222. As will be observed, the seal 234 protrudes beyond the outer periphery 230 of the seating ring 212, as well as beyond the end face 232 of the seating ring, to sealingly engage the outer and end walls of a valve chamber in which the seat assembly 210 is used. Further, a groove 236 is formed in the seal 234 adjacent the inner end 238 of the groove 228 to accommodate that portion of the seal 234 which is displaced when the seating ring 212 is forced against an end wall of a valve chamber, such as the end wall 50 of the valve structure 34a shown in FIG. 8.

The seat assembly 210 is useful in any of the valve structures previously described, but is particularly useful in a valve structure of the type shown in FIG. 8 wherein the valve ball 54 is a "floating" valve ball. In this environment, the outer seal 234 engages the respective end wall 50 or 52 in all positions of the valve ball 54a and maintains the respective inner seal 222 in sealing engagement with the valve ball at all times to further assure that both upstream and downstream seals will be provided in the valve.

Embodiment of FIGS. 17—19

FIG. 17 is a vertical sectional view through the major portion of a novel gate valve constructed in accordance with this invention and generally designated by reference character 334. The valve 334 comprises a tubular body 336 having an inlet 338 in one end thereof and an outlet 340 is in the opposite end thereof. Both the inlet 338 and the outlet 340 may be internally threaded or otherwise adapted for attachment to adjacent sections of a flow line (not shown). A valve chamber 342 is formed in the central portion of the valve body 336 in communication with the inlet 338 and outlet 340. The chamber 342 is of larger diameter than either the inlet 338 or the outlet 340 and forms an inwardly facing shoulder 344 surrounding the inlet 338 and an inwardly facing shoulder 346 around the outlet 340.

A gate member 348 is positioned to move downwardly across the valve chamber 342 to close the valve 334 as shown in FIG. 17 and, alternately, to be raised through an opening 350 in the top of the valve into a bonnet 352 secured to the top of the valve body 336 by screws or the like 354. The gate member 348 is raised and lowered by means of a valve stem 356 extending upwardly through the bonnet 352 to a suitable operating mechanism. Any desired mechanism may be mounted on the bonnet 352 in connection with the stem 356 for raising and lowering the gate 348, but since such mechanism forms no part of the present invention it is not shown in detail herein.

An upstream valve seat 358 in the form of a ring of high strength material, such as metal, is mounted in the valve chamber 342 against the shoulder 344. A similar seat 360 is mounted in the valve chamber 342 against the shoulder 346 to form a downstream seat for the gate 348. Each of the seats 358 and 360 has a suitable sealing ring 362 mounted in the outer periphery thereof to mate with the walls of the valve chamber 342 and prevent the leakage of fluid around the valve seats. The inner diameter of the upstream seat 358 is the same as the diameter of the inlet 338 adjacent the seat, and the inner diameter of the seat 360 is the same as the diameter of the outlet 340 at the inner end of the outlet, to provide for a smooth flow of fluid through the valve when the gate 348 is raised.

A novel seal 364 is mounted in the inner end face 366 of each of the seats 358 and 360 as is most clearly shown in FIG. 18. Each seal ring 364 is bonded in a mating groove 368 formed in the respective seat ring end face 366, and is preferably formed of a relatively soft elastic material, such as a natural or synthetic rubber composition having a durometer of from about 60 to about 70. Each groove 368 extends from the inner toward the outer periphery of the respective seating ring to communicate at one end thereof with the inlet or the outlet, as the case may be, when the valve is closed. It should also be noted here that the inner end face 366 of each seating ring radially outward of the respective groove 368 is in a position to slidingly engage the gate 348 when the gate is closed and thus provide an annular, rigid seating surface for the gate.

Each sealing ring 364 is of a thickness, in the relaxed condition of the seal ring, to protrude beyond or inwardly of the respective end face 366 seating surface a very slight distance, such as from .002 to .005 inches, to be engaged by the respective side face of the gate 348 when the valve is closed. However, the thickness of that portion of each sealing ring 364 protruding beyond the respective end face 366 seating surface is small compared with the thickness of that portion of the respective seal ring confined within the respective groove 368. For example, the total thickness of each seal ring 364 may be only .010 inches. On the other hand, the length of each seal ring, measured radially with respect to the ring, is large compared with the thickness of the seal ring in the relaxed condition of the seal ring. Each seal ring 364 is preferably at least four times as long as it is thick and is preferably about eight times as long as it is thick.

FIG. 19 illustrates the functions of the seal rings 364 as the gate 348 reaches the lower portion of the valve chamber 342 and illustrates the position of the gate 348 which would normally throttle fluid through the valve and cause erosion of the gate and seats. In the present valve, however, when the lower end of the gate 348 reaches a position level with the bottom of the inlet 338, the lower end of the gate engages the sealing rings 364 and immediately prevents further flow of fluid through the valve. Since each seal ring 364 protrudes into the valve chamber 342 beyond the respective seating ring end face 366 seating surface, the seal rings will be distorted when the gate 348 reaches the position shown in FIG. 19 as indicated by the bulges 370 in the seal rings. However, since the protrusion of each seal ring 364 is only slight, only slight bulging will occur. The bulging in FIG. 19 is shown enlarged to illustrate the principles involved.

As the gate 348 moves further downward from the position shown in FIG. 19 to the lower edges of the sealing rings 364, the bulging or the displacement of the elastic material of the sealing rings may in some instances cause a pinchoff of a small amount of the sealing rings. However, by virtue of the extended radial length of each seal ring 364, each seal ring will continue to function as an efficient seal during subsequent opening and closing of the valve.

When the gate 348 is fully lowered, as illustrated in FIG. 17, the upstream sealing ring 364 will be fully trapped by the walls of the groove 368 and the mating face of the gate 348 to prevent the leakage of fluid between this sealing ring and the gate 348 unless the pressure of the upstream fluid reaches substantially the rupturing pressure of the sealing ring 364. The sealing ring 364 on the downstream side of the gate 348 will not be trapped, by virtue of its communication with the outlet 40. However, as previously shown in connection with FIGS. 1 and 2, the material comprising the downstream sealing ring 364 will be in a high state of stress, and pressure which may exist in the valve chamber 342 will be effectively prevented from leaking between the downstream sealing ring 364 and the downstream side of the gate 348. Thus, the sealing rings 364 will provide both upstream and downstream seals for the valve 334.

In the foregoing discussion of the valve 334, it has been assumed that the gate 348 is connected to the stem 356 in such a manner as not to be movable in the valve chamber 342 toward either the inlet 338 or outlet 340. However, it may be noted that in the event the gate 348 is loosely connected to the stem 356, such as by the common T-slot connection, the sealing rings 364 will still provide both upstream and downstream seals, assuming that the valve seats 358 and 360 are movable lengthwise in the valve chamber 342. In this latter event, any buildup of pressure in the chamber 342 when the valve is closed will cause a retraction of the upstream seat 358 away from the gate 348 and allow a bleedoff of such pressure into the inlet 338.

Embodiment of FIG. 20

A slightly modified gate valve construction 334a is illustrated in FIG. 20. In this construction, the same valve body 336 and bonnet 352 are utilized. However, in this case, upstream and downstream seating rings 380 and 382 are seated against the valve chamber shoulders 344 and 346, wherein the entire inner end face 384 of each of these seats is is substantially flat to provide a gate seating surface. It will also be noted that a suitable sealing ring 386 is provided in the outer periphery of each of the seats 380 and 382 to prevent the leakage of fluids around the outer sides of the seats.

A modified gate 388 is provided for the valve 334a having an annular groove 390 in each side face thereof to receive a pair of sealing rings 392. The sealing rings 392 are constructed in the same manner as the sealing rings 364 used in the previously discussed valve 334 and are bonded in the mating grooves 390. Each sealing ring 392 projects very slightly from the respective side face 394 of the gate 388, whereby each seal 392 will be compressed between the gate and the respective valve seat 380 or 382 when the gate 388 is closed. It will be understood that the diameter of each sealing ring 392 conforms to the diameter of the respective seating ring 390 or 382 to provide effective upstream and downstream seals for the valve 334a. The gate 338 is raised and lowered by a suitable operating mechanism (not shown).

In operation of the valve 334a, each of the valve seals 392 will be placed in a state of high stress by being compressed between the gate 388 and the respective seating ring 380 or 382 when the valve is closed by virtue of the configuration or shape of each sealing ring. Each sealing ring 392 is dimensioned with the same ratios as the sealing rings 364 previously described. It may also be noted that since the gate 388 is sized such that the opposite side faces 394 thereof are in sliding contact with the inner end faces 384 of the seating rings 380 and 382, each of the seal rings 392 will be effectively trapped between the gate the and the respective seat when the valve is closed. Also, since each sealing ring 392 will be in a state of high stress, the maximum pressure will be required to further distort the seal and cause a leakage either from the inlet 338 into the valve chamber 342 or from the valve chamber 342 into the outlet 340.

Embodiment of FIG. 21

FIG. 20 is a partial sectional view through a further modified gate valve construction 334b varying from the gate valve 334 only in the shape of sealing rings utilized. In this instance, each sealing ring 400 is in the form of an annular body of relatively soft elastic material bonded in the respective groove 368 and having an annular bead 402 on the seal engaging face 404 thereof. The sealing engaging face 404 of each sealing ring 400 may be made coterminous with the inner end face 366 of the respective seating ring 358 or 360. However, it is preferred that the entire sealing engagement face 404 of each sealing ring 400 (other than the bead 402) project very slightly beyond the inner end face 366 of the respective seating ring to be at least lightly engaged by the gate 348 as the gate is moved downwardly, prior to the time the lower end of the gate reaches the lower portion of the bead 402, to provide an immediate shutoff when the lower end of the gate 348 reaches the lower portion of the inlet 338 and prevent throttling of fluid through the valve. In any event, however, the sealing bead 402 of each sealing ring 400 will be engaged by the gate 348 and be distorted to place the entire sealing ring 400 under a high state of stress when the valve is closed. The radial length of each sealing ring 400 is substantially larger than the thickness thereof, as discussed above in connection with the sealing rings 364, such that the sealing rings 400 will form effective upstream and downstream seals when the valve 334b is closed in the same manner as the seals 364 previously discussed. It may also be pointed out that the sealing rings 400 are not as subject to being pinched between the seating surfaces 366 of the seating rings 358 and 360 as were the sealing rings 364 in the valve 334.

Embodiment of FIG. 22

Another modified gate valve construction 334c is partially illustrated in FIG. 22 and conforms in all respects to the gate valve 334, except for the configuration of the sealing rings 406. In this instance, each sealing ring 406 is also an annular body of relatively soft elastic material bonded in the respective seating ring groove 368. Approximately the outer half 408 of the seal engaging face of each seal ring 406 is coterminous with the inner end face 366 of the respective seating ring, but the inner half 410 of the sealing engagement face of each sealing ring 406 is projected beyond the respective seating ring end face 366 a sufficient distance to be engaged and distorted by the gate 348 when the gate is closed. It will thus be seen that each sealing ring 406 is thicker near its inner periphery than near its outer periphery, but the seal ring is proportioned such that the radial length of the seal ring is substantially greater than the greatest thickness thereof.

In operation of the valve 334c, the lower end of the gate 348 will sealingly engage the seal rings 406 when the lower edge of the gate reaches the bottom of the inlet 338 to effectively shut off the valve at this point and prevent throttling. As the gate 348 moves on downward in a closing movement, the elastic material of each seal ring 406 is further distorted and compressed between the gate 348 and the respective seating ring 358 or 360 to place the sealing ring in a high state of stress. The sealing rings 406 also have the advantage of minimizing the possibility of a pinchoff of elastic material between the gate 348 and the inner end faces 366 of the seating rings when the valve 334c is being closed.

Embodiment of FIG. 23

Still another modified gate valve construction 334d is illustrated in FIG. 23. This valve construction also conforms in all respects to the valve 334 previously described, except for the seat and sealing assemblies. In this instance, each of the seating rings 358a and 360a is provided with a sealing ring 364a mounted in a mating groove 368a conforming in overall configuration and placement with the sealing rings 364 previously discussed in connection with the valve 334. Each of the seating rings 358a and 360a also is provided with an annular groove 412 in the inner end face 366 thereof extending from the outer periphery of the respective seating ring to a point spaced from the outer end of the groove 368a. Another sealing ring 414 of relatively soft elastic material is bonded in each of the outer grooves 412 to provide what may be considered double upstream and downstream seals.

The sealing rings 364a function in the same manner as the sealing rings 364 in the valve 334 to effectively shut off the valve 334d when the lower edge of the gate 348 reaches the bottom of the inlet 338 and provide both upstream and downstream seals when the valve is closed. The outer sealing rings 414 are primarily for the purpose of providing an additional downstream seal. It will be observed that the downstream sealing ring 414 will be effectively trapped between the gate 348 and the downstream seating ring 360a to enhance the effectiveness of the seal in preventing the leakage of fluid from the valve chamber 342 into the outlet 340. Also, of course, the upstream sealing ring 414 adds to the seal provided by the upstream sealing ring 364a to further assure that the valve 334d will be effectively closed and sealed, even when extremely high pressures are encountered.

From the foregoing it will be apparent that the present invention provides a novel valve seal which is usable in high pressure valve service, even though the seal is formed of a relatively soft elastic material. The seal has the maximum sealing, wear and abrasive resistance characteristics, and the effectiveness of the seal will not be destroyed through repeated opening and closure of the valve in which the seal is used. It will also be apparent that the present invention provides a novel valve wherein neither the valve member nor the load bearing portions of the seats of the valve will be subject to erosion. The present valve is particularly suited for handling both high pressure fluids and fluids containing abrasive materials. Further, the valve is simple and economical in construction and will have a long service life.

Changes may be made in the combination and arrangement of parts or elements, as heretofore set forth in the specification and shown in the drawings, without departing from the spirit and scope of the invention.

I claim:

1. In a valve, the combination of:

a seat member having a flow passage therein, a rigid seating surface thereon surrounding the flow passage, and an annular groove between the seating surface and the flow passage, said groove having an open side facing said flow passage;

a movable valve member for opening and closing said flow passage and having a rigid surface thereon adapted to engage said seating surface and overlie said groove when the valve is closed; and an annular seal of relatively soft elastic material bonded in said groove to form a seal between said members around the flow passage when the valve is closed, said seal having:

a first portion continuously exposed at the open side of said annular groove;

a sealing engagement, load bearing portion protruded beyond said seating surface, to be engaged by the valve member, whereby the seal is placed under a high state of stress when the valve is closed and is s distorted outwardly from said groove at the open side thereof;

said seal having a thickness, in its relaxed state, substantially less than the length of the protruded sealing engagement, load bearing portion thereof, and said seal further having a relieved portion adjacent said seating surface to minimize damage to said seal when the valve member is being moved to a closed position; and wherein said seal is a rubber composition having a durometer of between about 60 and about 70.

2. A valve as defined in claim 1 wherein the maximum thickness of said seal is no greater than one-fourth the length of the protruded sealing engagement, load bearing portion thereof in the relaxed condition of the seal.

3. A valve as defined in claim 1 wherein the maximum thickness of the seal is no greater than one-eighth the length of the protruded, sealing engagement, load bearing portion thereof in the relaxed condition of the seal.

4. A valve as defined in claim 1 wherein the thickness of the portion of the seal protruding beyond said seating surface is about one-third the total thickness of the seal.

5. A valve as defined in claim 1 wherein the portion of the seal protruding beyond said seating surface extends from the inner periphery of the seal to said relieved portion, and the surface thereof facing the valve member is parallel with said seating surface.

6. A valve as defined in claim 1 wherein the seal overlaps and is bonded to the inner periphery of the seat member.

7. A valve as defined in claim 1 wherein said seat member has a second annular groove therein surrounding said seating surface, and characterized further to include a second annular seal of relatively soft material bonded in said second groove having a thickness, in its relaxed state, substantially less than the length thereof, and having a portion thereof protruding beyond said seating surface to be engaged by the valve member, whereby said second seal is placed in a state of high stress when the valve is closed.

8. A valve as defined in claim 7 wherein said second seal further includes a relieved portion adjacent said seating surface.

9. In a valve, the combination of:

a seat member having a flow passage therein, a rigid seating surface thereon surrounding the flow passage, and an annular groove between the seating surface and the flow passage, said groove having an open side facing said flow passage;

a movable valve member for opening and closing said flow passage and having a rigid surface thereon adapted to engage said seating surface and overlie said groove when the valve is closed; and an annular seal of relatively soft elastic material bonded in said groove to form a seal between said members around the flow passage when the valve is closed, said seal having:

a first portion continuously exposed at the open side of said annular groove;

a sealing engagement, load bearing portion protruded beyond said seating surface, to be engaged by the valve member, whereby the seal is placed under a high state of stress when the valve is closed and is distorted outwardly from said groove at the open side thereof;

said seal having a thickness, in its relaxed state, substantially less than the length of the protruded sealing engagement, load bearing portion thereof, and said seal further having a relieved portion adjacent said seating surface to minimize damage to said seal when the valve member is being moved to a closed position; and wherein the surface of the seal facing the valve member increasingly protrudes beyond said seating surface from the inner periphery of the seal to said relieved portion.

10. A valve as defined in claim 9 wherein the surface of the seal facing the valve member adjacent the inner periphery of the seal does not protrude into the path of movement of the valve member.

11. A valve as defined in claim 9 wherein the depth of said groove increases from the inner to the outer periphery thereof.

12. In a valve, the combination of:

a seat member having a flow passage therein, a rigid seating surface thereon surrounding the flow passage, and an annular groove between the seating surface and the flow passage, said groove having an open side facing said flow passage;

a movable valve member for opening and closing said flow passage and having a rigid surface thereon adapted to engage said seating surface and overlie said groove when the valve is closed; and an annular seal of relatively soft elastic material bonded in said groove to form a seal between said members around the flow passage when the valve is closed, said seal having:

a first portion continuously exposed at the open side of said annular groove;

a sealing engagement, load bearing portion protruded beyond said seating surface, to be engaged by the valve member, whereby the seal is placed under a high state of stress when the valve is closed and is distorted outwardly from said groove at the open side thereof;

said seal having a thickness, in its relaxed state, substantially less than the length of the protruded sealing engagement, load bearing portion thereof, and said seal further having a relieved portion adjacent said seating surface to minimize damage to said seal when the valve member is being moved to a closed position; and wherein said relieved portion includes an annular groove in the surface of the seal facing the valve member wherein the bottom of the groove is substantially parallel with said seating surface.

13. In a valve, the combination of:

a seat member having a flow passage therein, a rigid seating surface thereon surrounding the flow passage, and an annular groove between the seating surface and the flow passage, said groove having an open side facing said flow passage;

a movable valve member for opening and closing said flow passage and having a rigid surface thereon adapted to engage said seating surface and overlie said groove when the valve is closed; and an annular seal of relatively soft elastic material bonded in said groove to form a seal between said members around the flow passage when the valve is closed, said seal having:
- a first portion continuously exposed at the open side of said annular groove; and
- a sealing engagement, load bearing portion protruded beyond said seating surface, to be engaged by the valve member, whereby the seal is placed under a high state of stress when the valve is closed and is distorted outwardly from said groove at the open side thereof;

said seal having a thickness, in its relaxed state, substantially less than the length of the protruded sealing engagement, load bearing portion thereof, and said seal further having a relieved portion adjacent said seating surface to minimize damage to said seal when the valve member is being moved to a closed position; and wherein said relieved portion includes an annular groove in the surface of the seal facing the valve member wherein the bottom of the groove is spaced from the path of movement of the valve member in the relaxed state of the seal.

14. In a valve, the combination of:

a seat member having a flow passage therein, a rigid seating surface thereon surrounding the flow passage, and an annular groove between the seating surface and the flow passage, said groove having an open side facing said flow passage;

a movable valve member for opening and closing said flow passage and having a rigid surface thereon adapted to engage said seating surface and overlie said groove when the valve is closed; and an annular seal of relatively soft elastic material bonded in said groove to form a seal between said members around the flow passage when the valve is closed, said seal having:
- a first portion continuously exposed at the open side of said annular groove; and
- a sealing engagement, load bearing portion protruded beyond said seating surface, to be engaged by the valve member, whereby the seal is placed under a high state of stress when the valve is closed and is distorted outwardly from said groove at the open side thereof;

said seal having a thickness, in its relaxed state, substantially less than the length of the protruded sealing engagement, load bearing portion thereof, and said seal further having a relieved portion adjacent said seating surface to minimize damage to said seal when the valve member is being moved to a closed position; and wherein the thickness of the seal progressively increases from the inner periphery of the seal to said relieved portion.

15. In a valve, the combination of:

an annular seat member having a flow passage therethrough and a rigid seating surface thereon surrounding the flow passage;

a valve ball member having a rigid seating surface thereon sized to engage the seating surface on the seat member when the valve is closed;

means in one of said members forming an annular groove arranged to face a portion of the seating surface on the other member when the valve is closed and terminating at one end in a shoulder defining one boundary of the respective seating surface, and open at its other end; and an annular seal of relatively soft elastic material bonded in said groove to form a seal between said members around said flow passage when the valve is closed:
- a portion of said seal being protruded beyond the seating surface of the member in which the seal is secured, whereby the seal is placed under a high state of stress when the valve is closed, and the peripheral portion of the seal adjacent the seating surface of the member in which the seal is secured being relieved to minimize damage to the seal when the ball member is being turned to a closed position; and
- said seal having a thickness, in its relaxed state, substantially less than the length of the protruded portion thereof.

16. A valve, comprising:

a body having a valve chamber therein and an inlet and an outlet communicating with the valve chamber;

a valve ball mounted in the valve chamber and adapted to be turned between open and closed positions;

an annular seat in the valve chamber encircling the inlet and having an annular, rigid seating surface shaped to mate with the valve ball and having an annular groove therein extending from the seating surface to the inner periphery of the seat;

an annular seal of relatively soft elastic material bonded in said groove to form a seal between the seat and ball when the valve is closed, said seal having an exposed portion at the inner periphery of the seat;

a sealing engagement, load bearing portion of said seal, spaced from said seating surface, being protruded beyond said seating surface in the relaxed state of the seal, whereby the seal is placed under a high state of stress when the valve is closed; and said seal having a relieved portion adjacent said seating surface to minimize damage to the seal when the valve ball is being moved to a closed position; said seal having a thickness, in its relaxed state, not more than one-eighth the length of said sealing engagement, load bearing protuberant portion thereof.

17. A valve as defined in claim 16 characterized further to include:

a second annular seat in the valve chamber encircling the outlet having an annular, rigid seating surface shaped to mate with the valve ball and having an annular groove therein extending from the respective seating surface to the inner periphery of the respective seat;

an annular seal of relatively soft elastic material bonded in the groove in said second seat to form a seal between the second seat and the valve ball when the valve is closed;

a portion of said last mentioned seal, spaced from the respective seating surface, being protruded beyond the respective seating surface in the relaxed state of the seal, whereby the last-mentioned seal is placed under a high state of stress when the valve is closed; and said last-mentioned seal having a relieved portion adjacent the respective seating surface to minimize damage to the seal when the valve ball is being moved to a closed position, and said last-mentioned seal having a thickness in its relaxed state not more than one-eighth the length of said protruded portion of said last mentioned seal.

18. A valve as defined in claim 17 characterized further to include means journaling the valve ball in the valve chamber on a fixed axis of rotation.

19. A valve as defined in claim 17 characterized further to include means supporting the valve ball in the valve chamber for movement toward and away from said second seat.

20. A valve seat assembly, comprising:

a seating ring formed of relatively rigid material having a valve seating surface on one face thereof and an annular groove in said one face coterminous with said seating surface and opening at the inner periphery of said seating ring;

an annular seal of relatively soft elastic material bonded in said groove having a sealing engagement portion thereof, spaced from said seating surface, protruding beyond said seating surface in the relaxed state of the seal, and said annular seal having a relieved portion between the protruding portion and said seating surface;

said seal having said sealing engagement portion thereof of a length substantially greater than the thickness of said seal in its relaxed state; and wherein said seal is a rubber composition having a durometer of between about 60 and about 70.

21. An assembly as defined in claim 20 wherein the maximum thickness of said seal is no greater than one-fourth the length of the sealing engagement portion thereof in the relaxed condition of the seal.

22. An assembly as defined in claim 20 wherein the maximum thickness of said seal is no greater than one-eighth the length of the sealing engagement portion thereof in the relaxed condition of the seal.

23. An assembly as defined in claim 20 wherein the thickness of the portion of the seal protruding beyond said seating surface is about one-third the total thickness of the seal.

24. An assembly as defined in claim 24 wherein the portion of the seal protruding beyond said seating surface extends from the inner periphery of the seal to said relieved portion and the surface thereof adapted to face a valve member is parallel with said seating surface.

25. A valve seat assembly, comprising:
a seating ring formed of relatively rigid material having a valve seating surface on one face thereof and an annular groove in said one face coterminous with said seating surface and opening at the inner periphery of said seating ring; and
an annular seal of relatively soft elastic material bonded in said groove having a sealing engagement portion thereof, spaced from said seating surface, protruding beyond said seating surface in the relaxed state of the seal, and said annular seal having a relieved portion between the protruding portion and said seating surface;
said seal having said sealing engagement portion thereof of a length substantially greater than the thickness of said seal in its relaxed state; and
wherein said relieved portion includes an annular groove in the surface of the seal adapted to face a valve member wherein the bottom of said last-mentioned groove is substantially parallel with said seating surface.

26. A valve seat assembly, comprising:
a seating ring formed of relatively rigid material having a valve seating surface on one face thereof and an an annular groove in said one face coterminous with said seating surface and opening at the inner periphery of said seating ring; and
an annular seal of relatively soft elastic material bonded in said groove having a sealing engagement portion thereof, spaced from said seating surface, protruding beyond said seating surface in the relaxed state of the seal, and said annular seal having a relieved portion between the protruding portion and said seating surface;
said seal having said sealing engagement portion thereof of a length substantially greater than the thickness of said seal in its relaxed state; and
wherein said relieved portion includes an annular groove in the surface of the seal adapted to face the valve member wherein the bottom of said last-mentioned groove is spaced inwardly, with respect to the seating ring, from said seating surface.

27. A valve seat assembly, comprising:
a seating ring formed of relatively rigid material having a value seating surface on one face thereof and an annular groove in said one face coterminous with said seating surface and opening at the inner periphery of said seating ring; and
an annular seal of relatively soft elastic material bonded in said groove having a sealing engagement portion thereof, spaced from said seating surface, protruding beyond said seating surface in the relaxed state of the seal, and said annular seal having a relieved portion between the protruding portion and said seating surface;
said seal having sealing engagement portion thereof of a length substantially greater than the thickness of said seal in its relaxed state; and
wherein the thickness of the seal progressively increases from the inner periphery of the seal to said relieved portion.

28. A valve seat assembly, comprising:
a seating ring formed of relatively rigid material having a valve seating surface on one face thereof and an annular groove in said one face coterminous with said seating surface and opening at the inner periphery of said seating ring; and
an annular seal of relatively soft elastic material bonded in said groove having a sealing engagement portion thereof, spaced from said seating surface, protruding beyond said seating surface in the relaxed state of the seal, and said annular seal having a relieved portion between the protruding portion and said seating surface;
said seal having said sealing engagement portion thereof of a length substantially greater than the thickness of said seal in its relaxed state; and
wherein the surface of the seal adapted to face a valve member increasingly protrudes beyond said seating surface from the inner periphery of the seal to said relieved portion.

29. An assembly as defined in claim 20 wherein the seal overlaps and is bonded to the inner periphery of the seating ring.

30. A gate valve seat assembly, comprising:
a seating ring of high strength material having concentric grooves in one end face thereof, one of said grooves extending from the inner periphery of the seating ring and the other of said grooves extending from the outer periphery of the seating ring, and said end face between said grooves being formed substantially flat to form an annular gate seating surface; and
a seal ring of relatively soft elastic material in each of said grooves, each of said seal rings having a thickness, in its relaxed condition, to protrude beyond said seating surface and having a length, measured radially with respect to the seal ring and along the portion thereof which protrudes beyond said seating surface, substantially greater than the thickness in the relaxed condition of the seal ring.

31. A valve seat assembly, comprising:
a seating ring formed of relatively rigid material having a valve seating surface on one face thereof and an annular groove in said one face coterminous with said seating surface and extending from said seating surface to the inner periphery of said seating ring, said groove increasing in depth from the inner to the outer periphery thereof; and
an annular seal of relatively soft elastic material bonded in said groove and having a portion thereof, spaced from said seating surface, protruding beyond said seating surface in the relaxed state of the seal, and having a relieved portion between the protruding portion and said seating surface;
said seal having a length substantially greater than the thickness thereof in its relaxed state.